United States Patent [19]

Kent

[11] Patent Number: 5,138,936
[45] Date of Patent: Aug. 18, 1992

[54] UNLIMITED AMPLITUDE ROLLING PISTON

[76] Inventor: Elie Kent, 1, Basel Street, Herzlia 46600, Israel

[21] Appl. No.: 636,088

[22] Filed: Dec. 28, 1990

[30] Foreign Application Priority Data

Jan. 1, 1990 [IL] Israel .................................. 92946

[51] Int. Cl.$^5$ ............................................. F01B 19/00
[52] U.S. Cl. ............................... 92/98 D; 92/103 F; 92/103 R
[58] Field of Search .......... 92/96, 98 R, 98 D, 103 F, 92/103 R, 103 SD, 107, 108, 109

[56] References Cited

U.S. PATENT DOCUMENTS

| | | | |
|---|---|---|---|
| 1,038,636 | 9/1912 | Oxnard | 92/98 D |
| 1,077,472 | 11/1913 | Hofmann . | |
| 2,178,953 | 11/1939 | Chilton | 92/98 D |
| 2,460,168 | 1/1949 | Caserta | 92/103 F |
| 2,692,618 | 10/1954 | Ludowici | 92/98 D |
| 2,849,026 | 8/1958 | Taplin . | |
| 3,083,734 | 4/1963 | Taplin . | |
| 3,137,215 | 6/1964 | Taplin . | |
| 3,311,028 | 3/1967 | Taplin . | |
| 3,438,309 | 4/1969 | Boileau . | |
| 3,549,142 | 12/1970 | Tilton | 92/103 F |
| 3,972,346 | 8/1976 | Wormser | 92/109 |
| 4,024,770 | 5/1977 | Liesenborghs | 92/98 D |
| 4,070,946 | 1/1978 | Sandvik et al. | 92/130 R |
| 4,281,589 | 8/1981 | Stoll | 92/109 |
| 4,378,935 | 4/1983 | Brown et al. | 92/98 D |
| 4,741,252 | 5/1988 | Harter et al. | 92/98 D |

FOREIGN PATENT DOCUMENTS

| | | | |
|---|---|---|---|
| 551265 | 11/1956 | Italy | 92/103 F |
| 423927 | 9/1974 | U.S.S.R. | 92/98 D |
| 405686 | 2/1934 | United Kingdom . | |
| 883295 | 11/1961 | United Kingdom | 92/103 F |
| 1396864 | 6/1975 | United Kingdom | 92/98 D |

Primary Examiner—Thomas E. Denion
Attorney, Agent, or Firm—Helfgott & Karas

[57] ABSTRACT

A rolling piston comprises a substantially cylindrical piston slidably supported within a chamber. One end of the chamber is sealed by a first sealing cap including a circular base portion having a fluid inlet therethrough and opposite ends of a substantially tubular flexible diaphragm are sealingly anchored around a first end of the piston and around an inside periphery of the first sealing cap, respectively. The diaphragm comprises a cylindrical thin-walled outer sleeve having high axial tensile strength and a cylindrical, thin-walled inner sleeve inside the outer sleeve and contiguous therewith having high elasticity both longitudinally and radially.

12 Claims, 5 Drawing Sheets

UNLIMITED AMPLITUDE ROLLING PISTON

FIELD OF THE INVENTION

This invention relates to hydraulic and pneumatic rolling pistons.

BACKGROUND OF THE INVENTION

Hydraulic and pneumatic machines have long been known wherein work is performed by means of the application of a fluid under pressure to the base of a piston. As is known, such pistons are adapted for sliding movement within a cylinder and, in order to prevent fluid leakage around the edges of the piston, suitable sealing means are provided around the edge of the piston so as to form a fluid-tight seal between the piston and the cylinder. Typically, the sealing means is provided by an "O"-ring, accommodated within a corresponding recess around the periphery of the piston, such that the piston and combined "O"-ring form a fluid-tight seal within the cylinder.

Such an arrangement requires very accurate machining of the internal surface of the cylinder, since any flaws thereon would quickly abrade the "O"-ring, thereby destroying the seal and rendering the device at best inefficient and at worst, inoperative.

Additionally, in such known hydraulic and pneumatic pistons, there exists a high coefficient of friction between the "O"-ring and the internal surface of the cylinder, which friction manifests itself as a loss of energy in the form of heat and a consequent loss of efficiency of the machine.

Various solutions have been proposed for a so-called "frictionless" hydraulic piston, wherein a piston is adapted for sliding movement within a cylinder, an improved sealing means being provided which produces virtually no sliding friction throughout the piston's travel. U.S. Pat. No. 3,311,028 discloses the basic arrangement for a "frictionless" piston, incorporating a flexible, rolling diaphragm. The diaphragm is a sleeve of flexible material, e.g. rubber, one end of which fits over the piston and is sealed thereto. The other end of the sleeve is anchored around its external surface to the base of the hydraulic cylinder. As fluid is applied to the base of the piston within the cylinder, the piston rises, thereby causing the flexible sleeve to unroll. As force is applied to the piston from the other side, the piston falls, thereby causing the flexible sleeve to roll in upon itself such that the inner surface of the sleeve progressively faces outwards. Consequently, the rolling sleeve is referred to as a "flexible diaphragm".

Such an arrangement does indeed vastly reduce sliding friction between the piston and the internal cylinder wall. However, in order for the flexible diaphragm to be able to roll in on itself, as described, such that its internal surface progressively faces outwards, it must be formed of a material which is laterally compressible and, so far, this has demanded that relatively soft materials be employed therefor. The drawback of such an arrangement is that a high fluid pressure applied to the base of the piston is also applied to the internal surface of the flexible diaphragm, thereby causing the diaphragm to expand and, eventually, tear.

U.S. Pat. No. 3,438,309 describes a similar arrangement wherein there are additionally provided reinforcing means on the outer surface of the flexible diaphragm, which serve to prevent tearing of the diaphragm under the application of high hydraulic pressure. However, the proposed reinforcing means greatly restrict the movement of the piston, rendering it unsuitable for many practical applications.

A further drawback with many prior art systems concerns the fact that the rolling diaphragm itself is frusto-conical in shape in order that a tapering section of the diaphragm can roll easily into a wider section thereto. The use of such flexible diaphragms imposes a restraint on the stroke of the rolling piston in which it is used and this, in turn, severely constrains the resulting mechanical advantage of the hydraulic or pneumatic piston.

U.S. Pat. Nos. 2,849,026; 3,083,734; and 3,137,215, all in the name of J. F. Taplin, are directed to various methods for manufacturing rolling sealed diaphragms. Essentially, the methods disclosed by Taplin all rely on superimposing a flat, reinforcing membrane over a flat, flexible membrane and then moulding the two membranes together into a substantially frusto-conical hat-shaped or cylindrical diaphragm. Such diaphragms have a peripheral rim which is anchored between opposing flanges of a suitable cylinder. It will readily be apparent that rolling seal diaphragms produced in such manner are suitable for rolling pistons having a very limited stroke and are therefore subject to the same drawback concerning mechanical advantage as has already been explained.

Furthermore, since such membranes can only be manufactured by moulding, the manufacturing process is time-consuming and the resulting cost of each unit is relatively high.

BRIEF SUMMARY OF THE INVENTION

It is an object of the invention to provide a rolling piston in which the drawbacks associated with hitherto-proposed rolling pistons are substantially reduced or eliminated.

According to the invention, there is provided a rolling piston, comprising:
- a substantially cylindrical piston,
- an annular support around said piston for permitting axial sliding movement thereof,
- a first sealing cap including a circular base portion having a fluid inlet therethrough and a wall portion projecting from a periphery thereof,
- first and second anchoring means for sealingly anchoring opposite ends of a substantially tubular flexible diaphragm around a first end of the piston and around an inside periphery of the first sealing cap, respectively;

wherein the diaphragm comprises:
- a cylindrical thin-walled outer sleeve having high axial tensile strength and
- a cylindrical, thin-walled inner sleeve inside the outer sleeve and contiguous therewith having high elasticity both longitudinally and radially.

Since the diaphragm comprises cylindrical, as opposed to frusto-conical, membranes the stroke of the piston according to the invention is limited only by the length of the diaphragm.

Furthermore, the inner and outer sleeves comprising the diaphragm may be extruded separately, the two sleeves being cut to any required length and the inner sleeve being subsequently manipulated into the outer sleeve. Mass-manufacture of the two sleeves using extrusion or other known methods results in significantly lower unit costs.

BRIEF DESCRIPTION OF THE DRAWINGS

For a better understanding of the invention and to show how the same may be carried out in practice, reference should be made to the accompanying drawings, in which.

DETAILED DESCRIPTION OF PREFERRED EMBODIMENTS

In order to show more particularly the improvements of the invention, there will be described with reference to FIG. 1 the principal features of a pneumatic spring incorporating a typical prior art rolling diaphragm, such as is disclosed in U.S. Pat. No. 1,077,472 (J. Hofmann).

Figure 1:
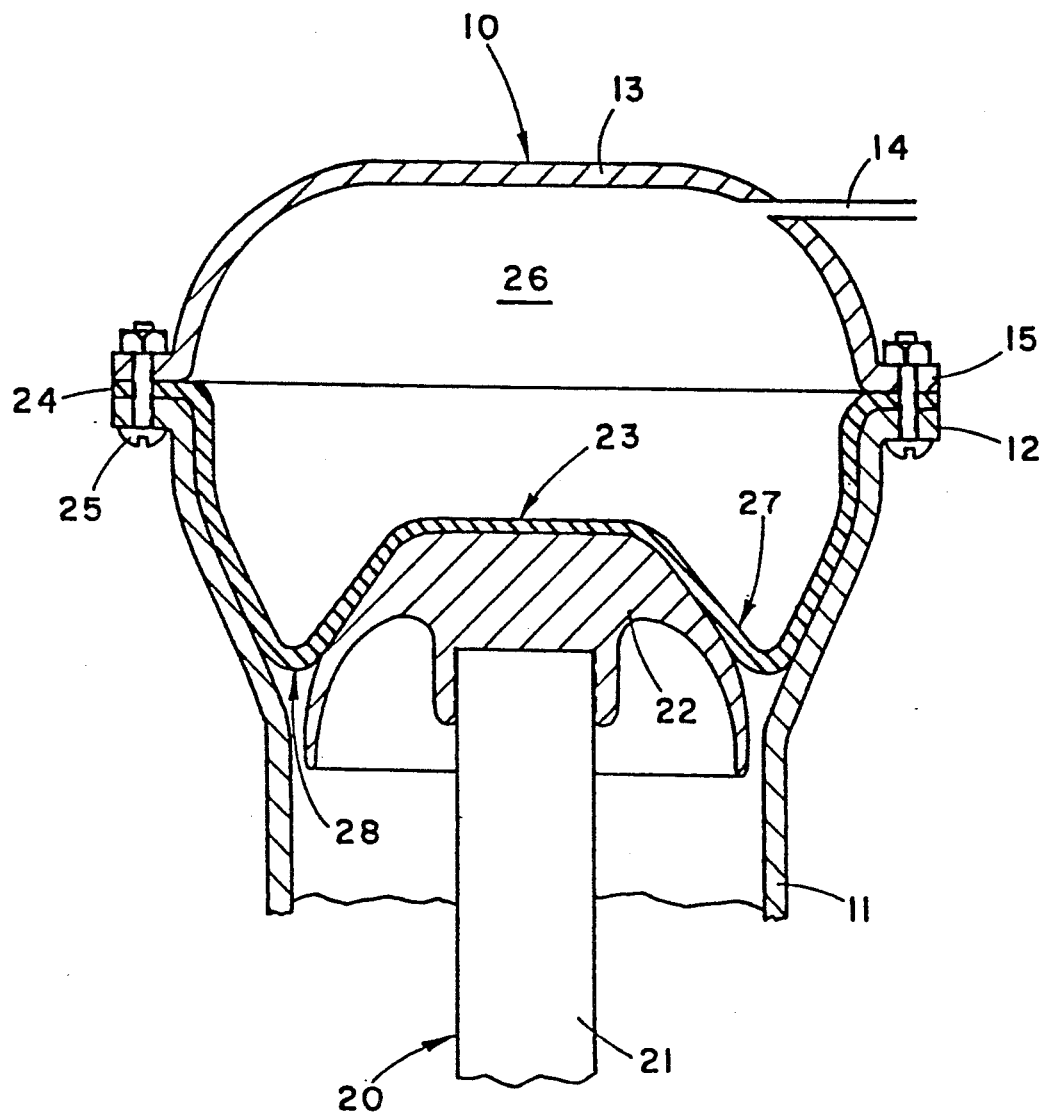
FIGS. 1, 2(a) and 2(b) show a typical arrangement of prior art rolling seal diaphragms.

FIG. 1 shows a chamber portion 10 having an essentially cylindrical side-wall 11 tapering at its upper end and having a peripheral flange 12 around its upper edge. A cover plate 13 having a fluid inlet 14 is provided with a peripheral flange 15 around its lower edge for coupling to the peripheral flange 12 of the side-wall 11.

A piston 20 having a piston rod 21 coupled at its upper end to an essentially frusto-conical piston head 22 is provided for axial sliding movement within the chamber 10, the external diameter of the piston head 22 being somewhat less than the internal diameter of the side-wall 11 so that there exists no contact friction between the piston head 22 and the side-wall 11.

In order to provide a fluid seal between the piston 20 and the side-wall 11, there is provided a flexible diaphragm seal 23 in the form of an inverted, essentially hat-shaped member having a rim 24 secured between the flanges 12 and 15 by means of bolts 25 passing through corresponding apertures in the flanges 12 and 15 and the rim 24 of the diaphragm 23. In this manner, the diaphragm 23 is sealingly secured between the two sections of the chamber 10 so as to form an essentially fluid-tight upper section 26 which can be completely filled with a fluid, e.g. air, under pressure via the fluid inlet 14. An outer surface of the flexible diaphragm 23 is seated against the piston head 22 such that longitudinal movement of the piston 20 produces a corresponding rolling movement of the flexible diaphragm 23.

It will be apparent from the foregoing description that the maximum permissible longitudinal displacement of the piston 20 is severely constrained owing to the relatively small dimensions of the flexible diaphragm 23. The dimensions of the diaphragm 23 are, in turn, restricted owing to the frusto-conical surface which contacts the piston head 22. Frusto-conical diaphragms are typically employed because as the piston 20 travels upward, an inner surface 27 of the diaphragm 23 has, in effect, to roll upwards within an outer surface 28 thereof. If the two surfaces 27 and 28 were parallel, such rolling movement would be inhibited on account of the thickness of the diaphragm 23. However, such a problem is overcome by employing a frusto-conical shape as described.

Figure 2A:
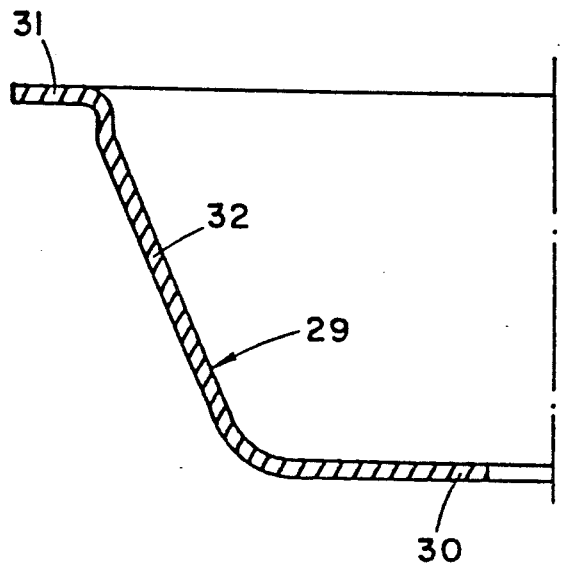
Figure 2B:
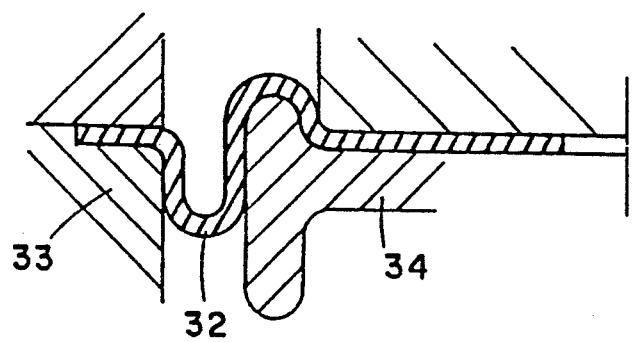

FIGS. 2(a) and 2(b) of the drawings show the rolling action of a prior art frusto-conical diaphragm as described, for example, in British Patent No. 405,686. There is shown one half of a frusto-conical diaphragm 29 having inner and outer flange portions 30 and 31 lying in substantially parallel planes and interconnected by a conical portion 32. The outer flange 31 is secured to an external cylindrical support 33 in known manner.

The inner flange 30 is secured to a piston 34 capable of executing longitudinal movement parallel to the axis of the cylindrical support 33. In response to such movement, the conical portion 32 of the diaphragm 29 undergoes deformation as shown in FIG. 2(b) so as to enable the inner flange 30 to move axially with respect to the fixed outer flange 31. Thus, here again the use of a frusto-conical shaped diaphragm permits rolling movement of the flexible diaphragm.

Nevertheless, the use of such a shaped diaphragm severely restricts the range of applications for which rolling pistons of this type may be used, on account of the limited vertical displacement to which the piston may be subjected.

Figure 3:
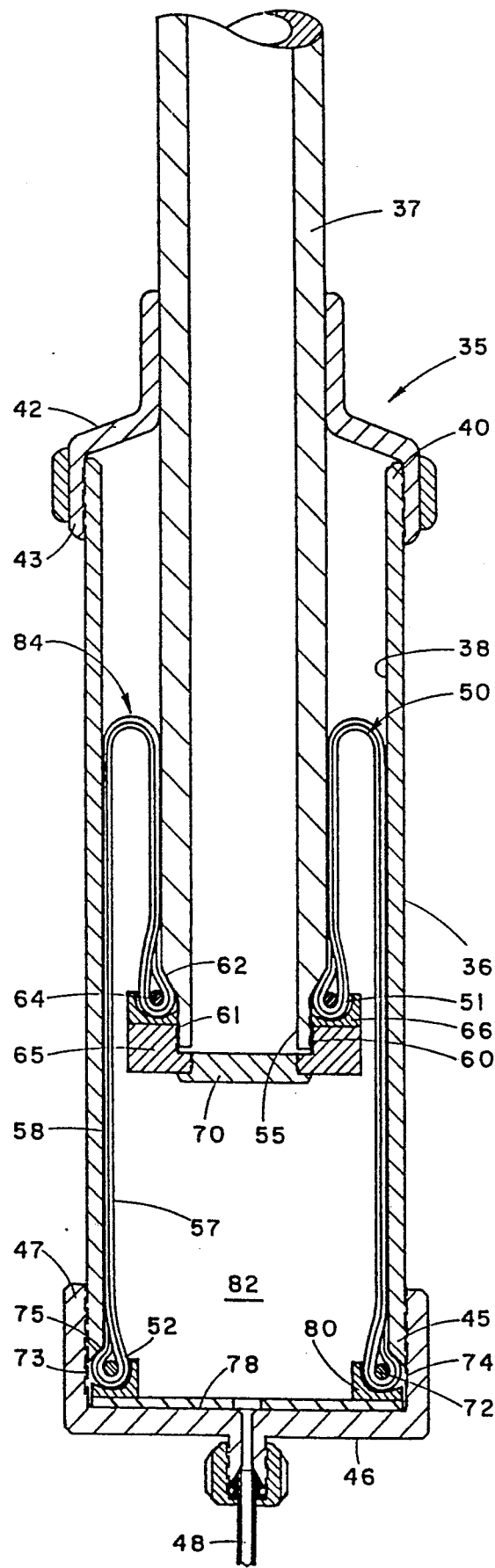
FIG. 3 shows a sectional elevation of a first embodiment according to the invention.

Referring to FIG. 3 of the drawings, there will now be described a rolling piston 35 according to the invention, comprising a substantially cylindrical chamber 36 and a substantially cylindrical piston 37 which is sealingly and slidably supported therein. The piston 37 has a maximum external diameter which is less than a corresponding internal diameter of the chamber 36 so that contact friction is avoided between the piston 37 and an internal surface 38 of the chamber 36.

The piston 37 is slidably supported at a first end 40 of the chamber 36 by means of a suitable end cap 42 having an internally-threaded side-wall 43 for engaging complementary threads on the first end 40 of the chamber 36. The end cap 42 is provided with a suitable aperture therein for accommodating the piston 37 therethrough.

The chamber 36 is sealed at a second end 45 thereof by means of a chamber end cap 46 (constituting a first sealing cap) having an internally-threaded side-wall portion 47 which engages complementary external threads on the second end 45 of the chamber 36. The chamber end cap 46 is provided with a fluid inlet 48 for allowing gas or liquid to be introduced under pressure to the chamber 36, according to the particular application for which the rolling piston 35 is intended for use.

In order to seal the chamber 36 with respect to the piston 37, there is provided a flexible tubular diaphragm 50, opposite ends of which 51 and 52 are respectively sealingly anchored around a first end 55 of the piston 37 and around an inside periphery of the chamber 36 towards its second end 45.

In such an arrangement, the diaphragm 50 comprises a thin-walled inner sleeve 57 having high elasticity both longitudinally and radially and a thin-walled outer sleeve 58 having high axial tensile strength and high radial elasticity. Preferably, the thin-walled inner and outer sleeves 57 and 58 are formed by extrusion as completely separate components which are subsequently cut to a required length corresponding to the internal height of the chamber 36, the inner sleeve 57 being manipulated into the outer sleeve 58 so as to be contiguous therewith. The inner sleeve 57 thus acts as a fluid-impervious sleeve which provides a fluid-tight seal between the piston 37 and the chamber 36, whilst the outer sleeve 58 acts as a reinforcing sleeve which protects the inner sleeve 57 when fluid is introduced under pressure into the chamber 36 via the fluid inlet 48.

The manner in which the ends 51 and 52 of the diaphragm 50 are sealingly anchored to the piston 37 and to the chamber 36 will now be described. Around the first end 55 of the piston 37 is provided a recess 60 (constituting a first peripheral recess) having a threaded side-wall portion 61 and a chamfered shoulder portion 62. The end 51 of the diaphragm 50 is wrapped around a first gripping ring 64 having an internal diameter such that the first gripping ring 64 may be accommodated within the recess 60 against the shoulder portion 62 thereof.

A first locking ring 65 is provided with an internal thread for engaging the threaded side-wall portion 61 of the recess 60. A resilient washer 66 is slipped over the recess 61 and the first locking ring 65 is then screwed tight around the threaded side-wall 61 of the recess 60 so as to displace the locking ring 65 towards the first gripping ring 64, and urge the latter against the shoulder portion 62 of the recess 60, whereby the end 51 of the diaphragm 50 is sealingly anchored between the shoulder portion 62 and the first locking ring 65 in combination with the washer 66.

The washer 66 protects the end 51 of the diaphragm 50 as the first locking ring 65 is tightened against it and, in particular, it prevents rotation of the first locking ring 65 from translating a corresponding rotational movement to the first end 51 of the diaphragm 50 which, if allowed to happen, would distort the diaphragm 50 and possibly lead to damage thereof.

In FIG. 3, the piston 37 is shown as being tubular and, in order to prevent fluid from entering the first end 55 of the piston 37, the first locking ring 65 is provided in the form of a substantially cap-shaped member having a base portion 70 which seals the open end 55 of the piston 37.

The second end 52 of the diaphragm 50 is sealingly anchored around the second end 45 of the chamber 36 by means of a second gripping ring 72 around which the second end 52 of the diaphragm 50 is wrapped. Thus, a second recess 73 (constituting a second peripheral recess) is formed by means of an internally-threaded sidewall portion 74 of the chamber end cap 46 for accommodating the second gripping ring 72 therein. The second gripping ring 72 has an external diameter such that it is accommodated within the second recess 73 against a shoulder portion 75 formed by chamfering the second end 45 of the chamber 36.

The chamber end cap 46 has a base portion 78 around a periphery of which is located a resilient washer 80, whereby tightening the end cap 46 onto the second end 45 of the chamber 36 displaces the base portion 78 towards the second gripping ring 72, whereby the second gripping ring 72 is urged against the shoulder portion 75, thereby sealingly anchoring the second end 52 of the diaphragm 50 against the shoulder portion 75 and the base portion 78 via the intervening washer 80. The washer 80 serves the same objective as the washer 66 and protects the second end 52 of the diaphragm 50 as the end cap 46 is tightened against it. In particular, it prevents rotation of the end cap 46 from translating a corresponding rotational movement to the second end 52 of the diaphragm 50 which, if allowed to happen, would distort the diaphragm 50 and possibly lead to damage thereof.

In such an arrangement, the diaphragm 50 defines a fluid-tight cavity 82 sealed at one end by the piston 37 in combination with the first locking ring 65 and sealed at its opposite end by the chamber end cap 46 in combination with the annular wall of the chamber 36. In this respect the chamber 36 may be considered as a second locking ring since it serves effectively to anchor the second gripping ring 72 within the second peripheral means 73 against the base portion 78 of the chamber end cap 46.

In operation, a fluid is injected under pressure through the fluid inlet 48 so as completely to fill a cavity 82 formed between the base plate 78, the sealed second end 55 of the piston 37 and the inner sleeve 57 of the diaphragm 50. For an equilibrium position of the piston 37, such as shown in FIG. 3, fluid pressure acts against the inner sleeve 57 so that the outer, reinforcing sleeve 58 is pushed firmly against the internal surface 38 of the chamber 36 and against an outer wall of the piston 37. Additional pressure urges the piston 37 to move upwards within the chamber 36 so as to unroll the diaphragm 50 and expand the cavity 82.

In a contrary manner, applying pressure to the piston 37 in a downwards direction allows the diaphragm 50 to roll in on itself, distortion, e.g. buckling, of the diaphragm 50 being prevented, partly on account of the counteracting pressure within the cavity 82 in combination with the fact that the thickness of the inner and outer sleeves 57 and 58 is very small.

In such an arrangement, the inner sleeve 57 acts as a fluid-impervious membrane for sealing the cavity 82, whilst the outer, reinforcing sleeve 58 protects the inner sleeve 57 from the effect of high pressure within the cavity 82 which, if the outer, reinforcing sleeve 58 were not present, would tend to tear the inner sleeve 57 along a line 84 at which the curvature of the diaphragm 50 renders it most vulnerable to damage.

Figure 4:
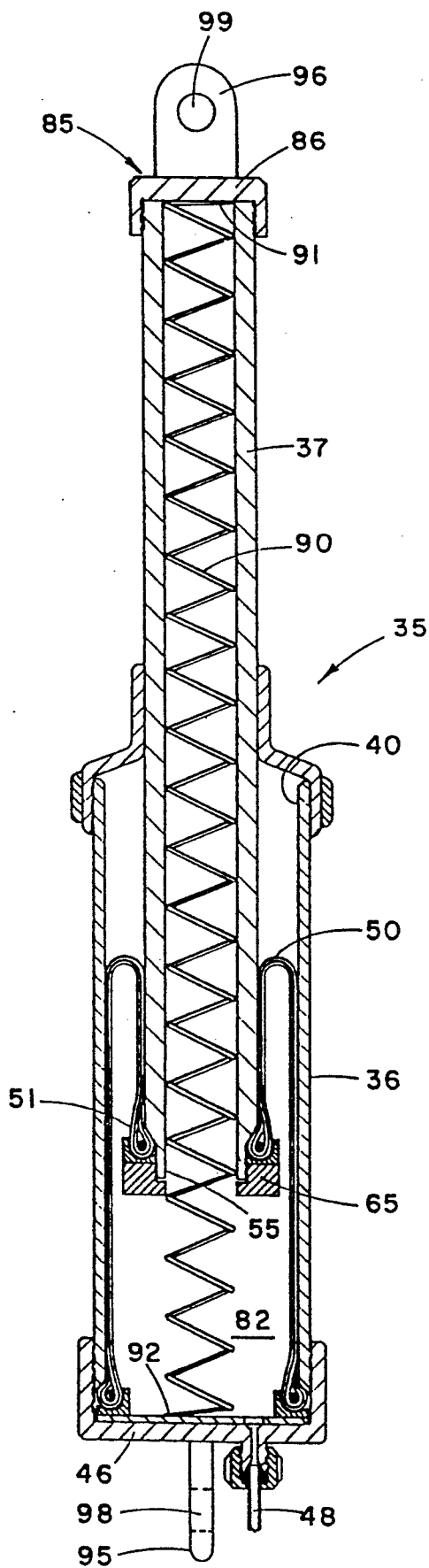
FIG. 4 shows a sectional elevation of a second embodiment according to the invention.

Referring now to FIG. 4 of the drawings, there will briefly be described a second embodiment of a rolling piston according to the invention, wherein components already described with reference to FIG. 3 will be referred to by identical reference numerals. Thus, the rolling piston 35 comprises a cylindrical piston 37 slidably supported at a first end 40 of a cylindrical chamber 36. The chamber 36 is sealed at a second end 45 thereof by means of a chamber end cap 46 having a fluid inlet 48 therethrough.

A flexible tubular diaphragm 50 is sealingly anchored at opposite ends thereof around a first end 55 of the piston 37 and around an inside periphery of the chamber 36 towards the second end 45 thereof, respectively. The diaphragm 50 may be anchored to the chamber 36 and the piston 37 in a manner substantially identical to that described above with reference to FIG. 3 of the drawings.

The piston 37 is tubular and is sealed at a second end 85 thereof outside the chamber 36 by means of a piston end cap 86 (constituting a second sealing cap) having an internally-threaded side-wall portion 87 for engaging complementary threads on an external wall of the piston 37 at its second end 85.

The first end 55 of the piston 37 is uncovered and there is further provided a coil spring 90 anchored at a first end 91 thereof to the piston end cap 86 and at a second end 92 thereof to the chamber end cap 46. Support lugs 95 and 96 are attached to the chamber end cap 46 and the piston end cap 86, respectively, for supporting the rolling piston 35 via apertures 98 and 99 provided in the support lugs 95 and 96.

In such an arrangement, the sealed cavity 82 includes also the hollow, tubular portion of the piston 37, whereby increasing the fluid pressure within the cavity 82 allows the piston 37 to slide upwards within the chamber 36, the diaphragm 50 unrolling in a manner identical to that described previously with reference to FIG. 3 of the drawings. However, in the second embodiment, reducing the fluid pressure within the cavity 82 allows the piston 37 to return under the action of the coil spring 90 whilst permitting the flexible diaphragm 50 to roll in on itself, again without distortion on account of the internal pressure within the cavity 82 and the fact that the inner and outer sleeves 57 and 58 of the diaphragm 50 are formed of very thin-walled material.

Figure 5:
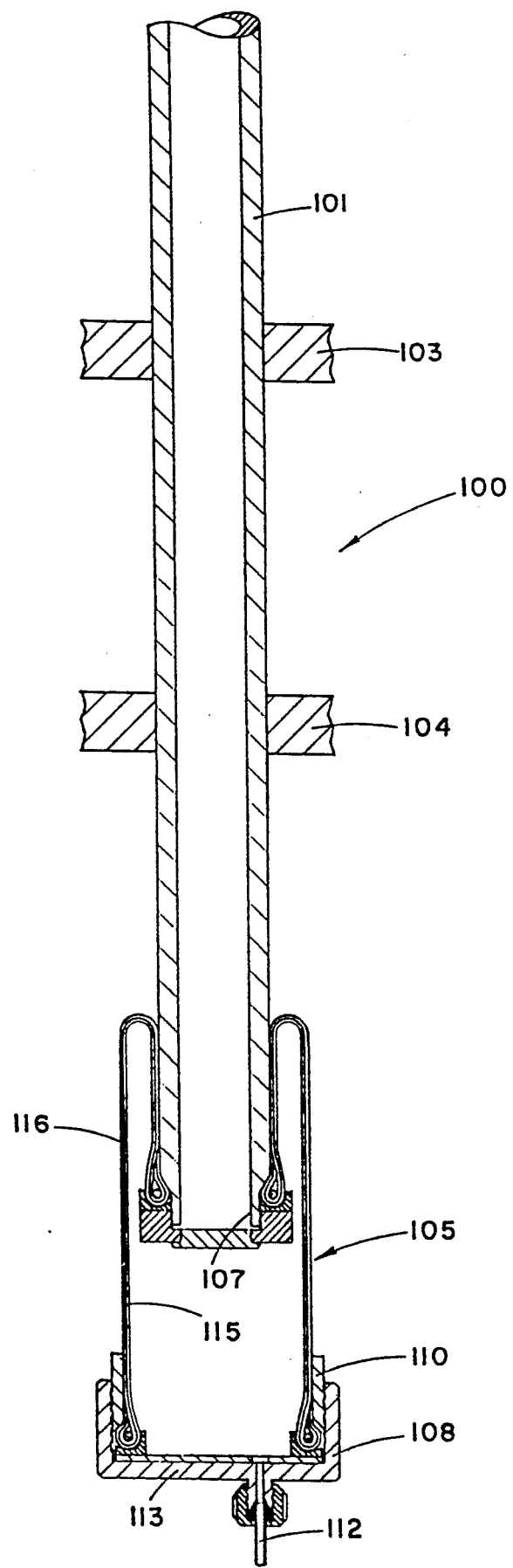
FIG. 5 shows a sectional elevation of a third embodiment according to the invention.

Referring now to FIG. 5 of the drawings, there is shown a third embodiment of a rolling piston 100 according to the invention. The rolling piston 100 comprises a cylindrical piston 101 which is slidably supported by means of annular support members 103 and 104 so as to be capable of axial movement. A flexible tubular diaphragm 105 is sealingly anchored at opposite ends thereof around a first end 107 of the piston 101 and around an inside periphery of a first sealing cap 108, respectively.

The manner in which the flexible diaphragm 105 is secured to the first end 107 of the piston 101 is identical in all respects to that described above with reference to FIG. 3 of the drawings. Similarly, the manner in which the flexible diaphragm 105 is sealingly secured to the first sealing cap 108 is substantially identical to that described above with reference to FIGS. 3 and 4 of the drawings. However, in FIG. 5 no chamber is provided between the first sealing cap 108 and the annular support 104, there being provided only a locking ring 110 having an external thread for engaging a complementary internal thread provided in an inside wall of the first sealing cap 108. The locking ring 110 is functionally equivalent to the chamber 36 shown in FIGS. 3 and 4 in anchoring the flexible diaphragm 105 around the inside periphery of the first sealing cap 108.

A fluid inlet 112 is provided through a base 113 of the first sealing cap 108 and in all other respects the construction of the rolling piston 100 and the manner of sealing the flexible diaphragm 105 to the piston 101 and to the sealing cap 108 are as described above with reference to FIGS. 3 and 4 of the drawings.

The flexible diaphragm 105 comprises a thin-walled fluid-impervious inner sleeve 115 within a thin-walled, reinforcing outer sleeve 116. The inner sleeve 115 is formed of a material having high elasticity both longitudinally and radially whilst the reinforcing sleeve 116 is formed of a material having high axial and radial tensile strength. In this respect, the flexible diaphragm 105 is different from the flexible diaphragm 50 described above with reference to FIGS. 3 and 4 of the drawings, wherein the reinforcing sleeve may, but need not, have high radial tensile strength. In the first two embodiments, the cylindrical chamber supports the flexible diaphragm radially so that, under pressure, it will not be damaged. Consequently, with the provision of a chamber high radial tensile strength is not an essential property of the outer reinforcing sleeve.

However, in the third embodiment, wherein no cylindrical chamber is provided, the outer reinforcing sleeve 116 must have high radial tensile strength in order to prevent the flexible diaphragm 105 from being damaged under pressure.

The operation of the rolling piston 100 is identical to that of the first embodiment. Furthermore, it will be understood that the general concepts employed in the third embodiment are equally applicable to the second embodiment described with reference to FIG. 4, employ spring biasing means coupled between respective inside surfaces of opposing sealing caps for biasing the piston towards the fluid inlet.

Thus, according to the invention, there is provided a flexible, rolling diaphragm comprising respective impervious and reinforcing sleeves which may be extruded separately, both sleeves being cut to a required length and the impervious sleeve being manipulated into the reinforcing sleeve so as to be contiguous therewith. Such a diaphragm is particularly suited to mass manufacture with consequent savings in the unit cost of each diaphragm and the use of thin-walled sleeves imposes virtually no restriction on the maximum allowable lengths of such diaphragms or of rolling pistons in which they are employed.

It will be apparent that modifications may be made to the rolling piston as described above, without departing from the spirit of the invention. Thus, whilst the invention has been described with particular regard to hydraulic rolling pistons, it will be apparent that the basic principle is equally applicable to pneumatic rolling pistons employing compressed air, for example.

Likewise, whilst a preferred embodiment of the flexible diaphragm itself is produced by extruding the two sleeves as described above, it is also possible to mould the inner, fluid-impervious sleeve or to manufacture the outer, reinforcing sleeve by means of a weaving process in order to achieve similar results.

It will readily be understood that the chamber shown in the first two embodiments may have the form of a cage member connected between the piston support and the chamber end cap. In such an arrangement, the outer, reinforcing sleeve of the flexible diaphragm must also have a high radial tensile strength for the same reasons as explained above with reference to FIG. 5 of the drawings.

Furthermore, in those cases where a chamber or cage is provided, the chamber or cage may be secured to the piston support by any known means. Thus, whilst in the preferred embodiments interlocking screw threads are employed, it will readily be apparent to those skilled in the art that other forms of connection are equally suitable, such as, for example, adhesives when plastic components are employed.

It should also be noted that the second embodiment employing spring biasing means for biasing the piston towards the fluid inlet, permits the piston itself to be formed of a plurality of telescoping sections, thereby permitting the stroke of the piston to be increased. This, of course, is not possible in hitherto-proposed systems wherein the piston is generally closed at its lower end.

I claim:

1. An unlimited amplitude rolling piston, comprising:
    a substantially cylindrical piston;
    an annular support around said piston for permitting axial sliding movement thereof;
    a first sealing cap including a circular base portion having a fluid inlet therethrough and a wall portion projecting from a periphery thereof;
    a substantially tubular flexible diaphragm; and
    first and second anchoring means for sealingly anchoring opposite ends of said substantially tubular flexible diaphragm around a first end of the piston and around an inside periphery of the first sealing cap, respectively;
    said diaphragm including:
    a cylindrical thin-walled outer sleeve having high axial tensile strength, and a cylindrical, thin-walled inner sleeve inside the outer sleeve and contiguous therewith having high elasticity both longitudinally and radially, wherein the first and second anchoring means comprise respective first and second gripping rings around which are wrapped respective ends of the diaphragm, the first gripping ring having an internal diameter substantially equal to the external diameter of the piston at its point of contact therewith and the second gripping ring being of sufficient external diameter substantially equal to an internal diameter of said wall portion, and respective first and second locking means for preventing dislocation of the diaphragm with respect to the gripping rings.

2. The rolling piston according to claim 1, wherein:
a first peripheral recess is provided around the first end of the piston for accommodating therein the first gripping ring, and
the first locking means includes a first locking ring around the first peripheral recess for securing the first gripping ring together with the diaphragm attached thereto between a shoulder portion of the first peripheral recess and an opposing face of the first locking ring.

3. The rolling piston according to claim 2, wherein:
the second locking means includes a second locking ring inside the first sealing cap for securing the second gripping ring together with the diaphragm attached thereto between an internal surface of the base portion and an opposing face of the second locking ring.

4. The rolling piston according to claim 3, including:
a substantially cylindrical chamber surrounding the diaphragm and fixedly attached at a first end thereof to the annular support and attached at a second end thereof to the first sealing cap.

5. The rolling piston according to claim 4, wherein the second locking ring is constituted by a wall of the chamber at the second end thereof.

6. The rolling piston according to claim 4, wherein the chamber has an internal diameter substantially equal to an external diameter of the diaphragm.

7. The rolling piston according to claim 6, wherein the outer sleeve is formed of a material having a high radial elasticity.

8. The rolling piston according claim 4, wherein the chamber is in the form of a cage and the outer sleeve is formed of a material having a high radial strength.

9. The rolling piston according to claim 4, wherein the second gripping ring is located against an end surface of the chamber forming a shoulder portion of a second peripheral recess, whereupon fixedly attaching the first sealing cap on to the chamber retains the second gripping ring between said end surface and the internal surface of the base portion.

10. The rolling piston according to claim 9, wherein the respective shoulder portions of said first and second peripheral recesses are chamfered such that the respective angles subtended between the shoulder portions and corresponding wall surfaces of each recess are obtuse.

11. The rolling piston according to claim 2, wherein the first locking ring comprises a substantially cap-shaped member having a circular base portion projecting from a periphery of which there is provided a wall portion having an internal screw thread for engaging a complementary external screw thread on the first recess, an end surface of the wall portion remote from the base portion constituting the opposing face of the first locking ring.

12. The rolling piston according to claim 5, wherein respective washers are disposed between the diaphragm and the opposing face of the first locking ring and the internal surface of the first sealing cap whereby fixedly attaching the locking rings urges said opposing faces towards the corresponding gripping rings so as to grip the diaphragm between the gripping rings and respective faces of said washers whilst preventing axial rotation of the diaphragm.

* * * * *